US008484372B1

(12) United States Patent
Callon

(10) Patent No.: US 8,484,372 B1
(45) Date of Patent: Jul. 9, 2013

(54) DISTRIBUTED FILTERING FOR NETWORKS

(75) Inventor: Ross W Callon, Westford, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 339 days.

(21) Appl. No.: 12/277,461

(22) Filed: Nov. 25, 2008

Related U.S. Application Data

(63) Continuation of application No. 10/080,865, filed on Feb. 21, 2002, now abandoned.

(60) Provisional application No. 60/328,489, filed on Oct. 9, 2001.

(51) Int. Cl.
*G06F 15/173* (2006.01)

(52) U.S. Cl.
USPC ........... 709/238; 709/223; 709/239; 370/229; 713/154; 726/11; 726/22; 726/23; 726/24; 726/25

(58) Field of Classification Search
USPC ... 709/238, 243, 223, 239; 370/229; 713/154; 726/11, 22–25
See application file for complete search history.

(56) References Cited

U.S. PATENT DOCUMENTS

| | | | |
|---|---|---|---|
| 5,682,479 A * | 10/1997 | Newhall et al. ............... | 709/242 |
| 6,046,980 A | 4/2000 | Packer | |
| 6,047,322 A | 4/2000 | Vaid et al. | |
| 6,052,718 A * | 4/2000 | Gifford ......................... | 709/219 |
| 6,438,612 B1 * | 8/2002 | Ylonen et al. ................. | 709/249 |
| 6,453,345 B2 | 9/2002 | Trcka et al. | |
| 6,499,107 B1 | 12/2002 | Gleichauf et al. | |
| 6,560,654 B1 * | 5/2003 | Fedyk et al. ................... | 709/239 |
| 6,735,702 B1 * | 5/2004 | Yavatkar et al. ................ | 726/13 |
| 6,760,777 B1 * | 7/2004 | Agarwal et al. ............... | 709/238 |
| 6,854,063 B1 * | 2/2005 | Qu et al. ........................ | 726/13 |
| 6,886,102 B1 | 4/2005 | Lyle | |
| 7,028,179 B2 * | 4/2006 | Anderson et al. ............. | 713/154 |
| 7,058,015 B1 | 6/2006 | Wetherall et al. | |
| 7,139,838 B1 * | 11/2006 | Squire et al. ................... | 709/242 |
| 7,174,373 B1 * | 2/2007 | Lausier ......................... | 709/223 |
| 7,249,376 B2 * | 7/2007 | Wesinger et al. ............... | 726/11 |
| 7,295,516 B1 | 11/2007 | Ye | |
| 7,707,305 B2 * | 4/2010 | Afek et al. ..................... | 709/238 |
| 2002/0016926 A1 * | 2/2002 | Nguyen et al. ................ | 713/201 |
| 2002/0023230 A1 * | 2/2002 | Bolnick et al. ................ | 713/202 |
| 2002/0032854 A1 | 3/2002 | Chen et al. | |
| 2002/0101819 A1 * | 8/2002 | Goldstone ..................... | 370/229 |
| 2002/0157020 A1 | 10/2002 | Royer | |

(Continued)

OTHER PUBLICATIONS

Co-Pending U.S. Appl. No. 10/431,395, filed May 8, 2003; Ross W. Callon et al.; "Rate Limiting Data Traffic in a Network," pp. 1-56 (specification); Figs. 1-13 (13 pages).

(Continued)

*Primary Examiner* — Ario Etienne
*Assistant Examiner* — Michael C Lai
(74) *Attorney, Agent, or Firm* — Harrity & Harrity, LLP

(57) ABSTRACT

A firewall coordinates with devices in a network to create a distributed filtering system. The firewall detects an attack in the network, such as a distributed denial of service attack, and creates attack information defining characteristics of malicious packets used in the attack. The attack information is forwarded to the devices in the network. The devices use the attack information to configure themselves to detect packets having the characteristics of the malicious packets. After configuration, the devices detect and discard malicious packets.

27 Claims, 11 Drawing Sheets

U.S. PATENT DOCUMENTS

2003/0033421 A1    2/2003    Haeri et al.
2003/0039245 A1    2/2003    Khosravi et al.
2003/0065948 A1    4/2003    Wilkes

OTHER PUBLICATIONS

Co-Pending U.S. Appl. No. 10/234,455, filed Sep. 5, 2002; Ben Eater et al.; "Systems and Methods for Identifying Sources of Network Attacks," pp. 1-28 (specification); Figs. 1-6 (6 pages).

Co-Pending U.S. Appl. No. 10/281,446; filed Oct. 25, 2002; Scott Mackie; "Dynamically Inserting Filters Into Forwarding Paths of a Network Device;" pp. 1-17 (specification); Figs. 1-4 (4 pages).

Steve Gibson; DRDoS; Distributed Reflection Denial of Service; Gibson Research Corporation; http://grc.com/dos/drdos/htm; Feb. 22, 2002; pp. 1-23.

\* cited by examiner

DISTRIBUTED FILTERING FOR NETWORKS

This application is a continuation of U.S. patent application Ser. No. 10/080,865, filed Feb. 21, 2002 which claims priority of U.S. Provisional Patent Application Ser. No. 60/328,489, filed on Oct. 9, 2001, the disclosure of which is incorporated herein by reference.

BACKGROUND OF THE INVENTION

The present invention related generally to data processing systems and, more particularly, to systems and methods for filtering network traffic based on attacks.

The Internet consists of multiple interconnected networks that transfer data between a large number of devices, such as servers and clients. Routers are used to transfer the data in packets over communication links that connect the routers, clients, and servers.

Protocols specify how each device in the network interoperates with other devices. For example, the Internet Protocol (T) specifies the format for packets. Routing protocols are used in routers to select paths through the network. Other protocols specify the manner in which a client requests information from a server, and the manner in which the server returns the requested information to the client.

FIG. 1 illustrates clients and servers exchanging packets. The exchanges are shown using broken line arrows. In FIG. 1, a client connected to router C exchanges packets with a client connected to router A and a server connected to router D. Exchanging packets directly between clients is known as peer-to-peer networking. Packets may also be transferred directly between servers, illustrated in FIG. 1 by the server connected to router D exchanging packets with the server connected to router B. Server-to-server communication may occur, for example, when one server needs information from another server to respond to a client request.

Devices on the network often communicate freely with one another. For example, in FIG. 1 servers and clients communicate freely with each other. Sometimes, however, networks restrict access in certain ways. For example, a corporate network may limit network access to only employees of that corporation and customers. Although certain areas of a corporate network may be accessed by employees and customers, other certain areas may be limited to access by employees only.

Routers may be used to limit certain traffic flowing through the router. In some cases, for example, routers are configured to only forward packets that have particular characteristics, such as certain source and destination addresses from a list of permitted addresses.

One way to limit access to a particular group of users is a virtual private network (VPN). A VPN uses services provided by a public network, such as an Internet Service Provider (ISP), to connect particular users to one another, such as employees of a corporation. A VPN often makes use of a firewall between all or part of the VPN and the public network. The firewall filters traffic to ensure that traffic entering the VPN is traffic from another site of the same corporation, or from authorized users, such as customers, suppliers, and corporate partners.

Servers in the VPN handle requests from clients in the VPN. The rate of requests to the servers can be quite significant, and generally enough servers are deployed to fulfill the requests. There is usually even a substantial extra capacity for peak times when the rate of requests increase. But every server has a limit as to the rate it can respond to requests for services. If requests arrive too rapidly, service may be adversely affected if the servers cannot keep up with the rate of requests. Similarly, a given router, and a given communications link, also has a capacity limit.

Networks are under almost constant attacks by malicious users who wish to disrupt the network. One of the most common forms of attacks is a denial of service (DOS) attack in which a large number of request packets are sent to a server at a high rate and the server cannot keep up with the requests. Ultimately, the server is so overloaded that adequate service to legitimate clients is denied.

One common way to perform such an attack is to carry out a distributed denial of service (DDOS) attack. In a DDOS attack, multiple distributed systems are used in coordination to overload a server. In one form of DDOS attack, a computer virus or worm is used to configure multiple distributed computer systems to carry out the attack. The computer systems are usually innocent and are being used by someone to unwittingly carry out the attack. For example, multiple computer systems at a university may be configured over a network to simultaneously begin transmitting a large volume of traffic (e.g., malicious packets) at a high; rate to the same server. This results in a very large traffic load on the server and sometimes also on communications links used to access the server.

FIG. 2 illustrates a DDOS attack on a server. The firewall in FIG. 2 is implemented physically separate from the server, sitting between the server and a network router. In this implementation, the firewall receives network traffic from the router, filters the network traffic for attacks, and forwards acceptable traffic to the server.

Although the firewall illustrated in FIG. 2 is implemented physically separate from the server, some firewalls run directly on the server. A firewall running on a server operates in essentially the same manner as a physically separate firewall—examining incoming traffic and determining whether the traffic should be allowed to enter.

In FIG. 2, each malicious user has been configured to simultaneously bombard the server with malicious packets in an attempt to flood the server. In the attack is successful, the server will receive more requests than it can handle. This results in some combination of failure of the server, severe congestion on communications resources, such as links or routers in the network, or seriously disrupted service to legitimate users.

The firewall is used to detect the attacks. Upon detecting an attack, the firewall attempts to identify the malicious packets and drop them. Conventional firewalls are often implemented in software, but may be implemented in hardware, or both software and hardware. The firewall typically performs stateful filtering, which means that the firewall maintains state information related to recent requests for service sent to a server. Keeping track of recent requests to a server is necessary to detect attacks. In a DOS attack, for example, any one request might be valid when considered alone, but when multiple requests are considered together a malicious attack might be identified. When multiple requests come in from the same source, for example, the server may determine that the source is taking part in the attack and discard future requests for information from the source.

Although FIG. 2 illustrates using a firewall to detect an attack on a server, the firewall may also be used to detect an attack on any entity, such as a VPN. In this case, the firewall may be used to prevent unauthorized or malicious users from accessing the corporate network by discarding inappropriate packets at the firewall.

Note that, in general, detecting an attack needs to occur at one place since each malicious user participating in the attack might be sending few enough packets that it is not obvious that those packets are part of an attack. This has led to solutions where detection and defense against attacks occurs in one device. In other words, the discarding of the malicious packets occurs at the same device that detected the attack.

The malicious packets arriving at a single location creates other problems in addition to overloading the server. In many cases the link from the local router to the server and/or firewall will be sized just large enough to handle legitimate traffic expected by the server. The link from the router to the firewall may itself become so congested that service is denied. Thus, even if malicious packets are successfully discarded at the firewall, the loss of bandwidth on the link between the router and the server or firewall still represents a significant denial of service. Thus, even if the malicious packets are discarded before they reach the server in FIG. 2, the attack may nonetheless be successful, or at least partially successful. A sufficiently large attack may also congest other links in the communications network.

Another problem may arise because operation of the firewall consumes considerable resources. Thus, even after a firewall detects an attack, it still needs to spend some amount of CPU resources to discard each malicious packet. This problem is more of an issue when the firewall is running on the server, and is not as drastic in the physically separate firewall implementation illustrated in FIG. 2 because in the physically separate implementation the server itself does not consume its resources discarding packets. The firewall in FIG. 2, however, represents additional cost to the network. In addition, the network resources, including but not limited to the link from the local router to the firewall or server, need to carry the additional traffic, which therefore also represents wasted resources.

Thus, there is a need for adequately addressing attacks occurring in the network.

SUMMARY OF THE INVENTION

According to one embodiment of the invention, systems and methods consistent with the principles of the invention detect an attack, determine attack information identifying characteristics of the attack, and send the attack information to other elements. The attack information is used by the other elements to configure or create filters for detecting and discarding traffic that appears to match the characteristics defined in the attack information.

According to one aspect of the invention, attack detection devices and attack detection methods consistent with the principles of the invention monitor incoming traffic, detect an attack based on the incoming traffic, and generate attack information defining characteristics of the attack. The attack detection device then forwards the attack information to one or more other devices.

According to another aspect of the invention, attack response devices and attack response methods consistent with the principles of the invention receive attack information, configure a filter based on the attack information, and detect and discard traffic when traffic matches characteristics of the attack defined in the attack information.

Other aspects of systems, devices, and methods consistent with principles of the invention are described herein. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

DESCRIPTION OF THE EMBODIMENTS

Reference will now be made in detail to embodiments consistent with the principles of the invention, examples of which are illustrated in the accompanying drawings. The same reference numbers may be used in different drawings to refer to the same or like parts.

According to embodiments consistent with the principles of the invention, a firewall coordinates with elements in the network, such as network routers, to protect against attacks. Upon detecting an attack, the firewall may begin discarding packets associated with the attack, as is done in conventional systems. In addition, the firewall may also create attack information that is sent to one or more routers in the network.

The attack information includes criteria defining characteristics of packets that should be discarded because they are considered part of the attack and are therefore malicious. For example, the control packet may indicate source and destination addresses in the DOS packets. Additional information, such as User Protocol, TCP Port, etc., may also be optionally specified. In addition, the control packet may contain a time period during which the filter should be used by the router. The attack information may be sent in a control Packet, for example, and may be sent using a specialized control protocol or a conventional protocol. Although the embodiments described herein use one or more control packets to transport the attack information, any data transport format and mechanism may be used, and may depend on the particular type of network the distributed filtering system is implemented in.

A router receiving a control packet may then configure itself, for example by creating new filters or modifying existing ones, to detect and discard malicious packets received by the router. These filters may be simpler than the filters required to initially detect the attack.

The cooperation between the firewall and the network routers creates a distributed filtering capability in that the identification of an attack using filters, such as complex stateful filters, occurs at a firewall or server. But the bulk of discarding of malicious packets may occur at one or more routers in the network. Because some of the filtering and discarding is offloaded to elements in the network, the firewall filter may be simpler than would be required without distributed filtering.

Figure 1:
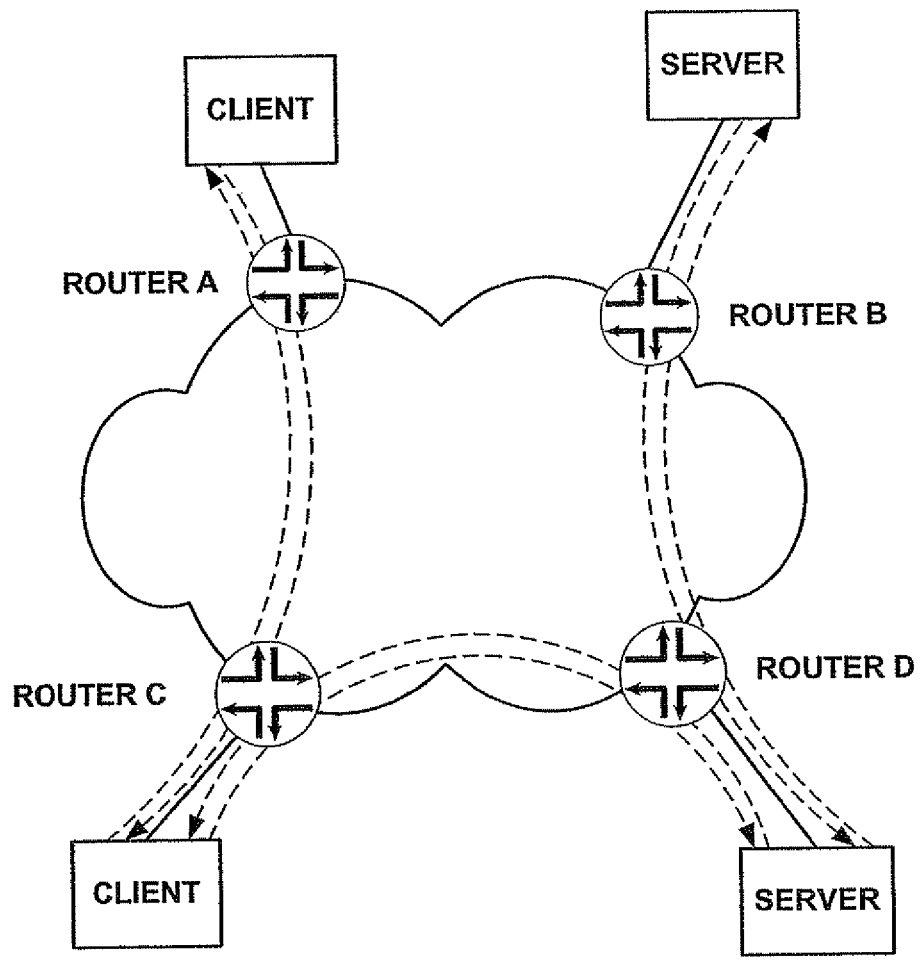
FIG. 1 illustrates various communication paths between clients and servers.
Figure 2:
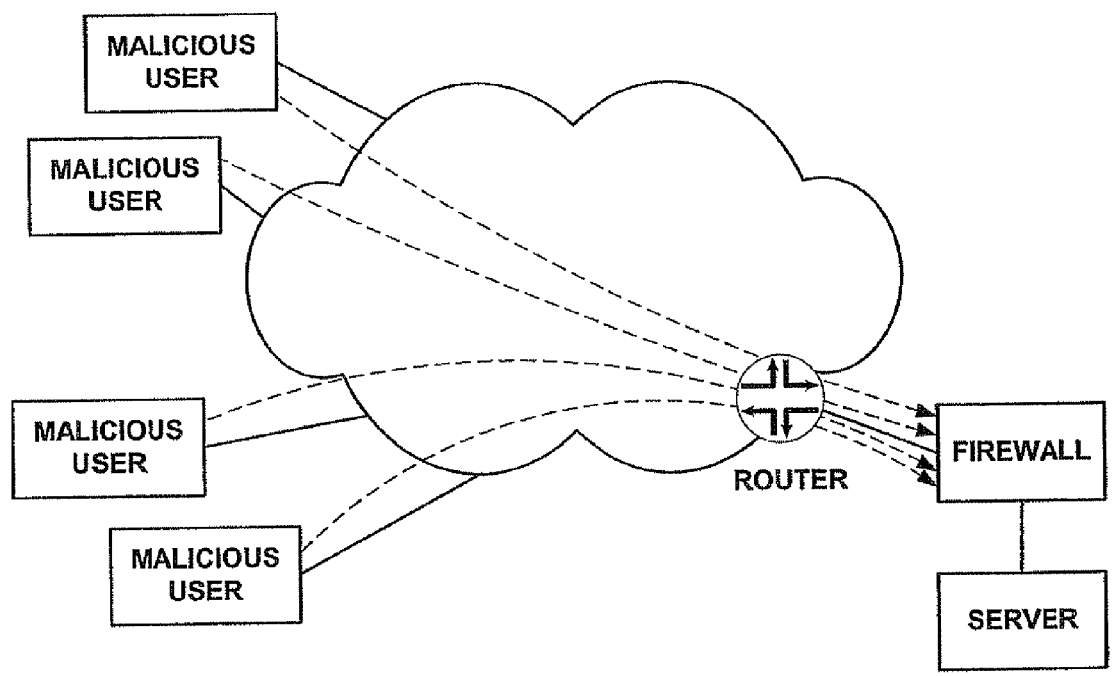
FIG. 2 illustrates an attack on a server.
Figure 3:
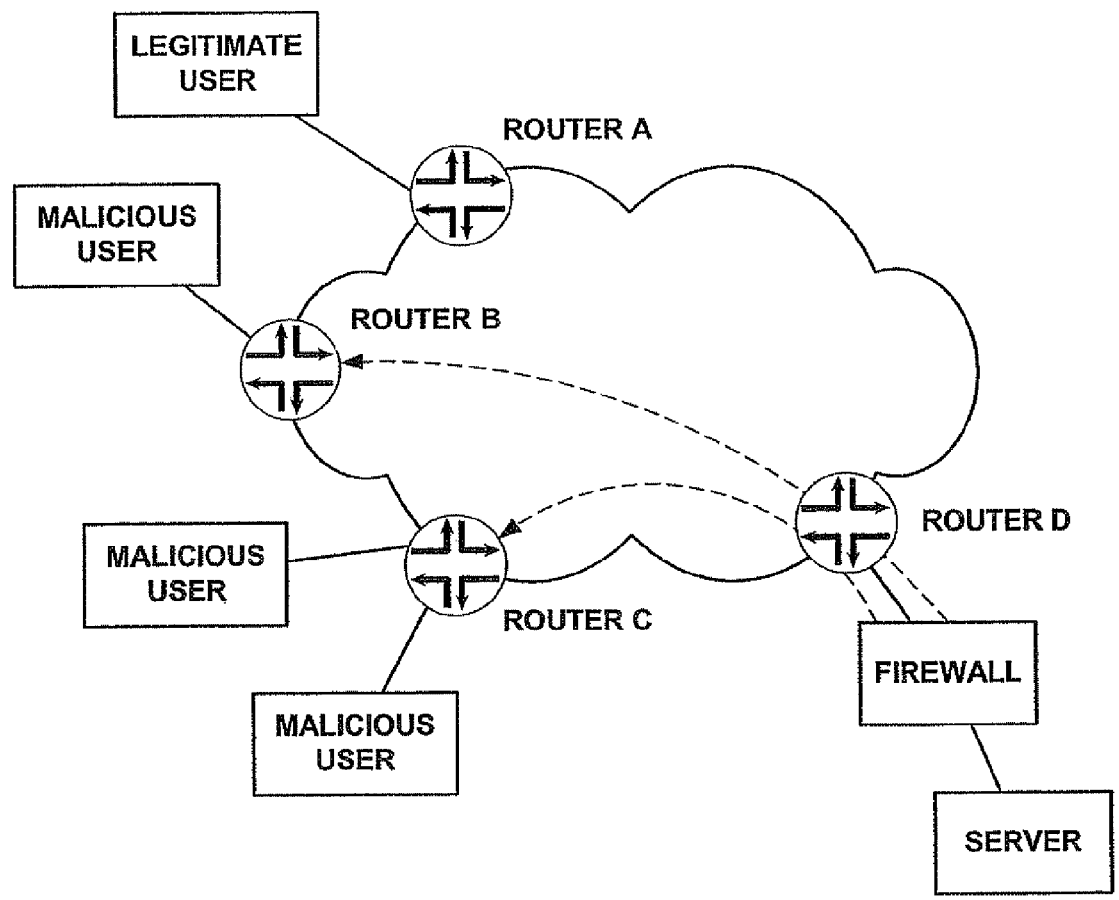
FIG. 3 illustrates a distributed filtering system consistent with the principles of the invention.

FIG. 3 illustrates an embodiment of distributed filtering consistent with the principles of the invention. An attack from one or more malicious users is initially detected at the firewall. The firewall includes attack detection elements, and responds to the attack by creating attack information and sending the attack information to routers B, C, and D in control packets, as indicated by broken line arrows in FIG. 3. Note that the source address used by the attacking systems might be legitimate, or might be made up. If the network has the ability to check the correctness of source addresses at all input points, then the source address of the attacking packets will be legitimate, and the firewall can determine where the attack is coming from, and the notification may be send to only the ingress routers from which the attack is arriving at the network. If the network does not have the ability to check source addresses at all ingress points, then initially, when the firewall detects the attack, it is not known where the attack is coming from. In this case the message describing the attack may be sent to all ingress routers (such as routers A, B, and C in FIG. 3). If the attack packets are well distinguished from other packets, or if stopping the attack completely is important enough to justify dropping other packets as well, then the ingress routers may be told to discard all packets which match the description of the attacking packets. Otherwise, the ingress routers may be told to rate limit all packets which match the description of the attack packets. Also note that the ingress routers may also be told to count packets which match the description of the attack packets, which facilitates later analysis of the form and location of the attack.

In response to the control packets, each of routers B, C, and D (and optionally router A) configures itself to detect malicious packets based on the attack information in the control, packets. Subsequent malicious packets from malicious users may then be detected by routers B, C, and D and either discarded or rate limited. Discarding some or all of the malicious packets at routers B, C, and D, greatly reduces the load on the firewall and/or server, the load on the link connecting the server to the network, and even the load on other links and elements in the network. This, in turn, significantly improves the service to legitimate users.

A similar approach can be used in any network where a firewall is protecting against unauthorized access to a network. For example, this approach may be used when a firewall protects a site of a corporate network.

Figure 4:
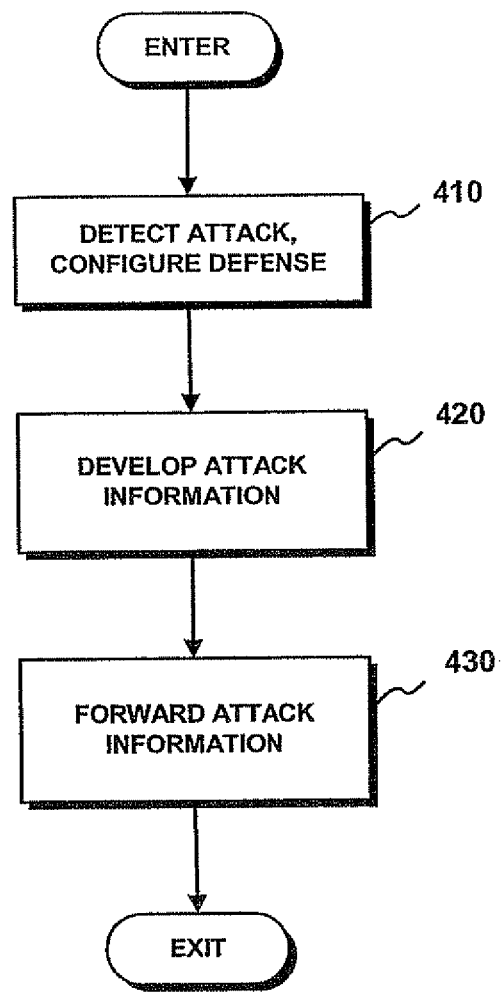
FIG. 4 illustrates a process performed by an attack detection device consistent with the principles of the invention.

FIG. 4 illustrates a process performed by an attack detection device consistent with the principles of the invention. Such an attack detection process may be used, for example, in the firewall illustrated in FIG. 3. The attack detection device first detects an attack and sets up a firewall defense configuration (act 410). The attack detection device also develops attack information based on the attack (act 420). The attack information may define some characteristic of the attack, such as a source, or a source-destination pair, or source-destination pair plus protocol field, or other characteristics. The attack detection device then forwards the attack information to devices in the network (act 430).

The attack detection device at some point may tear down the defense configuration. For example, once the routers are configured to prevent a particular attack the attack detection device may not see additional malicious packets for that attack because the malicious packets are stopped by the routers. The attack detection device therefore will not know when the attack has ceased. Even with normal filtering, attackers could temporarily halt the attack in order to make the firewall think that the attack is over, and then restart the attack later. This problem is therefore not unique to distributed filtering.

One solution to this problem is to wait a considerable amount of time (e.g., days), and then remove the attack detection device defense configuration for a particular attack. Removal may be based on any of a number of mechanisms, such as an administrative request or expiration of a timer. If the attack is still ongoing, or if it restarts, then the attack detection device will again detect the attack, and reset the required configuration.

Also, either network operators or the attack detection device could poll the routers periodically to determine how many packets are being discovered and discarded due to any particular attack. These numbers can be compared over time to determine when the attack ends. When packets are no longer being discarded based on a particular attack, the particular configuration based on that attack may be removed. This may be checked on a periodic basis; so that after an attack has ceased there will be some amount of time before the defense configuration is removed.

Thus, the attack detection device process of FIG. 4 may be modified to include additional acts after attack information is sent to the routers. The acts may include a mechanism for tearing down upon receiving an indication that the attack is over or that a period of time has elapsed.

Figure 5:
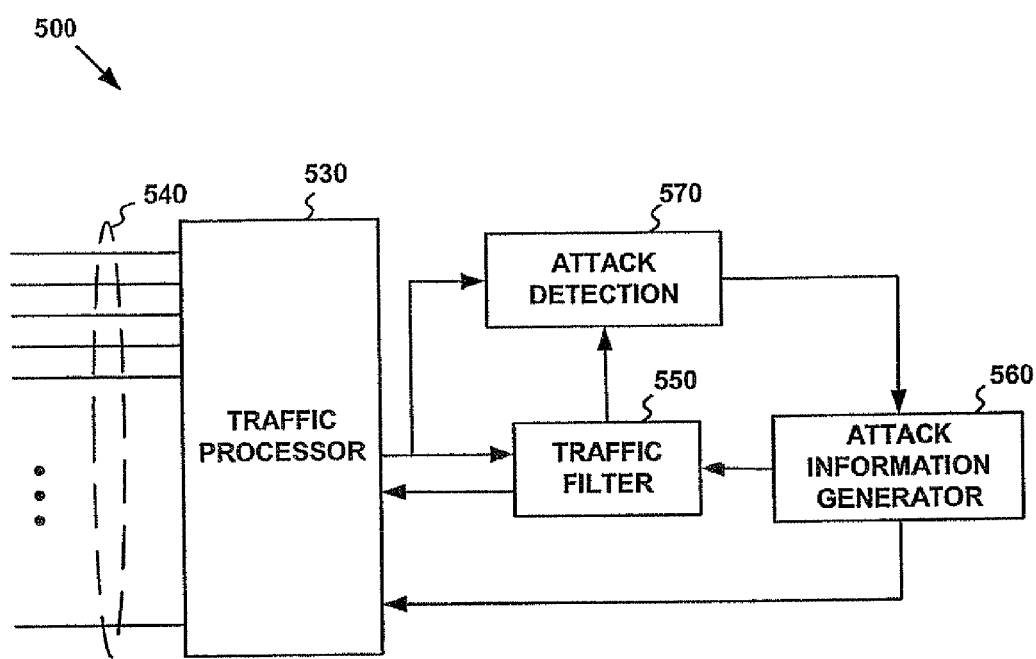
FIG. 5 illustrates an attack detection device consistent with the principles of the invention.

FIG. 5 illustrates an attack detection device consistent with the principles of the invention. The attack detection 500 may be used to perform the attack detection operations of the firewall of FIG. 3 or the process of FIG. 4. Attack detection device 500 is comprised of a traffic processor 530, a traffic filter 550, an attack detection element 570, and an attack information generator 560. Attack detection device 500 monitors incoming network traffic, detects an attack, generates attack information, and forwards the attack information out on the network to other devices. Network traffic is received and processed by in traffic processor 530. In a packet network system, for example, network traffic processor 530 may strip off layer 1 and layer 2 network headers and forward the remaining information.

Input/output lines 540 connect traffic processor 530 to other entities, such as networks and devices. Traffic processor 530 receives and outputs traffic on input/output lines, 540, and handles traffic processing between attack detection device 500 and the entities that attack detection device 500 is connected to via input/output lines 540.

Traffic processor 530 may forward incoming traffic to traffic filter 550 and attack detection element 570. Traffic filter 530 filters the incoming traffic and may perform filter-based operations on the traffic, such as traffic discarding and statistics gathering. Traffic filter 550 passes the filtered traffic to traffic processor 530. Traffic processor 530 may process the filtered traffic from traffic filter 550, and forward the filtered traffic out on the appropriate lines of input/output lines 540.

Traffic filter 550 sends filtering results to attack detection 570. Filtering results may include incoming traffic, information regarding the incoming traffic, and filter-based information created and collected by traffic filter 550.

Attack detection 570 may analyze the incoming traffic and the information from traffic filter 550, and detect attacks based on the traffic, the information from traffic filter 550, or both. In response to detecting an attack, attack detection 570 sends information related to the attack to attack information generator 560.

Attack information generator 560 creates attack information based on the information from attack detection element. The attack information may include information defining characteristics of the attack. For example, the attack information may include information that can be used in filtering out traffic that appears to be part of a detected attack.

Attack information generator 560 may forward the attack information to traffic filter 550. Traffic filter 550 may then use the attack information to create new filters or modify existing filters to filter out traffic that appears to be part of a detected attack.

Attack information generator 560 may also forward the attack information to traffic processor 530. Traffic processor 530 may forward the attack information to one or more devices in a network, and the devices may use the attack information to filter traffic that appears to be part of the attack detected by attack detection 570. In one embodiment consistent with the principles of the invention, traffic processor 530 sends the attack information on the network using packets, and may piggyback the attack information on a link state routing protocol.

The arrows in FIG. 5 illustrate general information flow. In practice, the elements may exchange information with each other as necessary to carry out the functionality of attack detection device 500. FIG. 5 illustrates particular elements relevant to embodiments consistent with the principles of the invention. Other elements may be included. For example, attack device 500 may be a standalone device or may be included in another device. Moreover, attack detection device 500 may be used in a firewall, such as the firewall illustrated in FIG. 3. In embodiments consistent with the principled of the invention, traffic filter 550, attack detection 570, and attack information generator 560 may be implemented as one or more separate elements and may be implemented entirely in hardware, entirely in software, or in both hardware and software.

Figure 6:
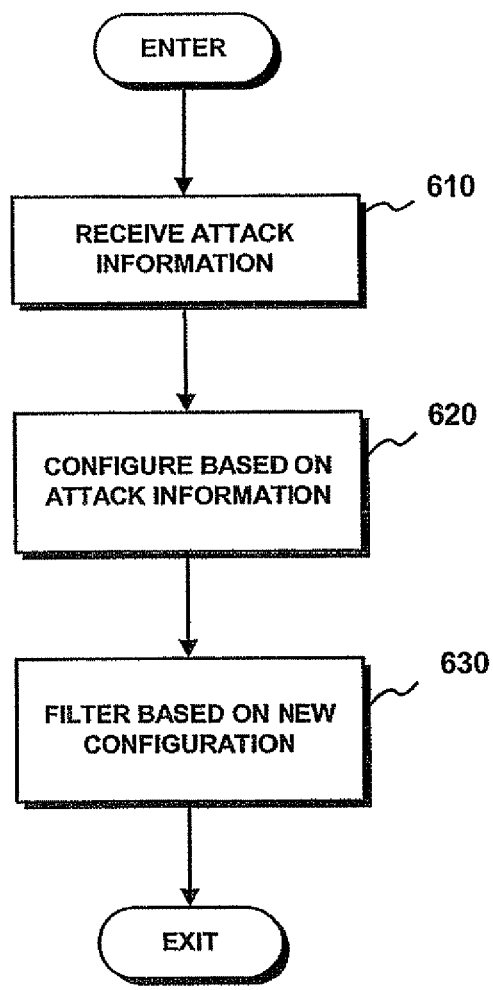
FIG. 6 illustrates a process performed by a router consistent with the principles of the invention.

FIG. 6 illustrates a process performed by an attack response device. The attack response device 720 may be used in a network device, such as router B Of FIG. 3. Attack response device 720 receives the attack information in control packets from an attack detection device (act 610) and configures itself based on the attack information (act 620). Configuring may include, for example, creating a filter or configuring an existing filter based on the attack information. The router then proceeds to detect and discard malicious packets based on the new configuration (act 630).

In addition to discarding or rate limiting malicious packets, attack response devices may also perform other monitoring of an attack, such as counting the number of discarded or malicious packets. The monitoring information may be used in subsequent analysis of an attack. Analyzing the attack may include, for example, identifying the source of the attack. Attacks may be initiated by one device and carried out by others. In such cases, the initiator does not necessarily correspond to the source address in the malicious packets, since an invalid source address might have been used. The attack response device may send the information regarding the attack back to the firewall for further analysis.

Thus, the router distributed filter configuration process of FIG. 6 may include additional acts, such as monitoring attacks and communicating with the firewall regarding ongoing issues with the attack.

Figure 7:
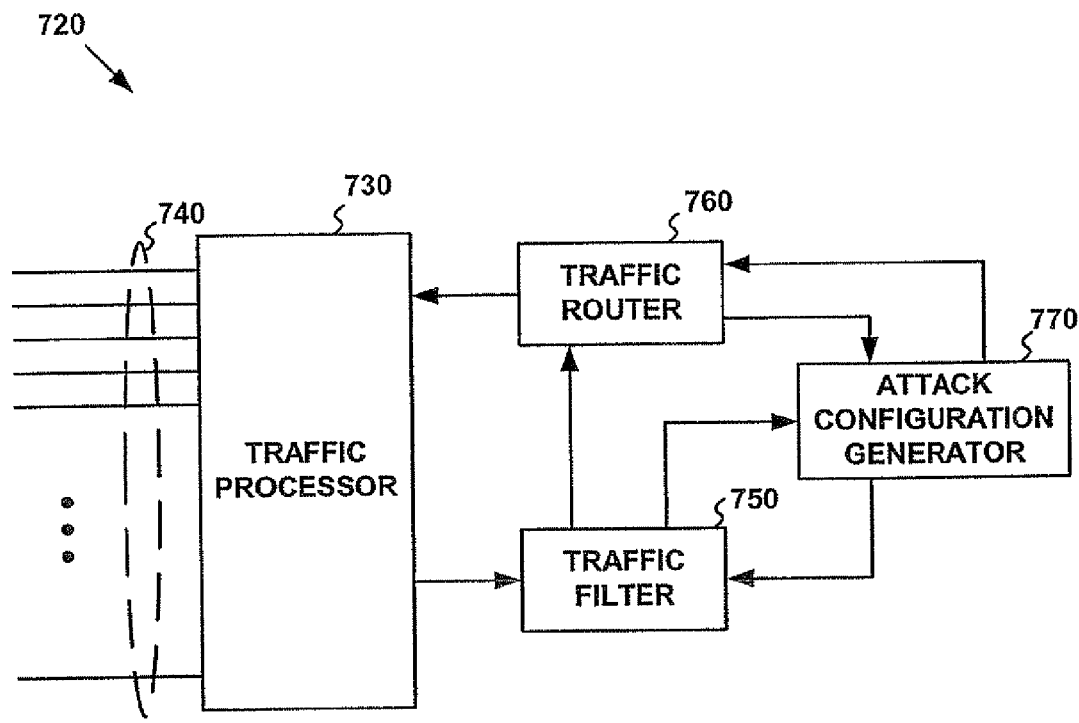
FIG. 7 illustrates an attack response device consistent with the principles of the invention.

FIG. 7 illustrates an attack response device consistent with the principles of the invention. The attack response device 720 may carry out the malicious packet detection and discard operations described with respect to FIG. 3. For example, attack response device 720 may be used in a network device, such as routers A, B, and C of FIG. 3. Attack response device 720 may also carry out the process described with respect to FIG. 6. Attack response device 720 comprises a traffic processor 730, a traffic filter 750, a traffic router 760, and an attack configuration generator 770. Attack response device 720 receives attack information and creates or configures existing filters so that the filters detect and discard traffic that appears to be part of an attack.

Traffic processor 730 receives traffic from input/output lines 740 and outputs traffic on input/output lines 740. Traffic processor 730 may process incoming traffic and forward the incoming traffic to traffic filter 750.

Traffic filter 750 filters the incoming traffic. Traffic filter 750 is connected to traffic processor 730, traffic router 760, and attack configuration generator 770. Filtering may include any type of conventional filtering operation, such as discarding network traffic, collecting statistics, and modifying bits in the network traffic if certain criteria are met. Some of the information developed by traffic filter 750 may be sent to attack configuration generator. Traffic filter 750 forwards traffic that is not discarded to traffic router 760.

Traffic router 760 is connected to traffic filter 750, traffic processor 730, and attack configuration generator 770. Traffic router 760 determines which of input/output lines 740 the network traffic should be sent out on, and forwards the traffic to traffic processor 730. In embodiments consistent with the principles of the invention, attack response device 720 may use any one of a variety of traffic processing techniques. For example, traffic router 760 may receive actual traffic, such as packets, from traffic filter 750, or simply a representation of the traffic, such as packet header information. In the latter implementation, traffic processor 730 may buffer the traffic data until receiving information from traffic router 760 regarding where the traffic data should be routed.

Some of the network traffic received by traffic router 760 may include attack information. Traffic router 760 forwards this traffic to attack configuration generator 770.

Attack configuration generator 770 receives the attack configuration information from traffic router 760 and the filter information from traffic filter 750, and develops attack configuration information. The attack configuration information defines characteristics of an attack that is used by traffic filter 750 to create new filters or modify existing filters, or both. Attack configuration generator 770 may also monitor ongoing attacks based on information received from traffic filter 750.

Attack configuration generator 770 may also send information regarding an attack to traffic router 760, which forwards the information to traffic processor 730 for output on input/output lines 740. This allows attack related information to be sent to other devices on the network. For example, the original attack information, or other attack information generated by attack configuration generator 770, or both, may be forwarded to one or more other attack response devices, such as attack devices in other routers in the network. The attack information or newly generated attack information may also be sent back to the originator of the attack information, such as a firewall.

The arrows in FIG. 7 illustrate general information flow. In practice, the elements may exchange information with each other as necessary to carry out the functionality of attack response device 720. FIG. 7 illustrates particular elements relevant to embodiments consistent with the principles of the invention. Other elements may be included. For example, attack response device 720 may be a standalone device or may be included in another device. In embodiments consistent with the principles of the invention, traffic filter 750, traffic router 760, and attack configuration generator 770 may be implemented as one or more separate elements and may be implemented entirely in hardware, entirely in software, or in both hardware and software.

Transmitting Attack Information

The firewall may send attack information to a router using a signal, one or more bits, fields, or packets, or some combination of these. The attack information may be sent using protocols typically used to configure routers, such as SNMP, HTTP/HTML, or XML.

To optimize distributed filtering, it may be desirable to discard packets at some distance from the server being attacked. Discarding malicious packets close to the source minimizes the need to carry malicious packets through the network. Also, it is desirable to discard various streams of malicious packets before the streams merge into a large stream, to reduce the likelihood of congestion in parts of the network.

To discard malicious packets close to their source, a firewall may advertise the attack information to routers throughout a network. In general, this requires flooding the attack information to multiple routers. A special-purpose flooding mechanism may be used for advertising the information. Special-purpose flooding mechanisms, however, can be complex to design, implement, test, debug, and deploy.

Advertising attack information in the network may be achieved without designing a special-purpose flooding mechanism. Commonly deployed link state routing protocols, such as OSPF or IS-IS, often include a reliable way to flood information throughout a network or area. Link state routing protocols are used by routers to exchange information regarding network topology among routers so that each router can compute paths to destinations within the network and to destinations outside the network. The link state information is advertised by the routers by flooding the network with link state packets.

A link state routing protocol can be thought of as divided into three clear phases:

(1) Hello: Each router exchanges packets with its immediate neighbors in order to determine and verify its local topology.

(2) Flooding: Each router creates an advertisement, or series of advertisements, which completely describe its local topology, and then floods these advertisements in a reliable fashion to other routers in the network. As a result of this phase, all routers in the network or within an area of the network have a complete and identical map of the topology of the network or area.

(3) Route computation: Each router runs a route computation on its map of the network (or area) in order to compute paths.

In embodiments consistent with the principles of the invention, attack information may also be distributed in the routing packets, such as link state routing packets (such as IS-IS, OSPF, or PNNI) or path vector routing packets (such as BGP). Thus, attack information may be piggybacked on conventional link state routing information. For example, the "Link State Packets" (used in IS-IS) or "Link State Advertisements" (used in OSPF) may be used to distribute the attack information.

With IS-IS, a new "Type/Length/Value" (TLV) triplet contained within a link state packet may be used to carry the attack information. With OSPF, a new "Opaque Link State Advertisement" may be used. IS-IS and OSPF have the capability to carry various forms of information in this manner. Therefore, in embodiments consistent with the principles of the invention, TLVs and/or Opaque LSAs may be used specifically for the purpose of carrying attack information.

Conventional firewalls and servers typically do not participate in the operation of routing protocols and therefore are not configured to handle link state routing protocols. Firewalls consistent with the principles of the present invention, however, may insert attack information in the link state routing information. Inserting attack information in the link state routing information may be accomplished in several ways. Three examples of inserting attack information are given below: proxy operation, send only operation, and full routing operation.

1. Proxy Operation

With proxy operation, the firewall detects an attack, develops attack information defining characteristics of the attack, and sends the attack information to one local router, or a small number of local routers, describing which packets need to be discarded (e.g., which filters need to be turned on or reconfigured in the routers). The local router or routers then acts as a proxy to other routers, and sends this information in link state information to other routers. For example, the attack information may be included in Link State Packets (IS-IS) or Link State Advertisements (OSPF). A simple protocol may be used for transmitting the attack information between firewalls and routers, and may use existing protocols, such as SNMP or HTTP/HTML.

Proxy operation has several advantages. It avoids adding the firewalls to the set of systems taking part in the operation of the routing protocol, and it avoids other complications, discussed in greater detail below.

Figure 8:
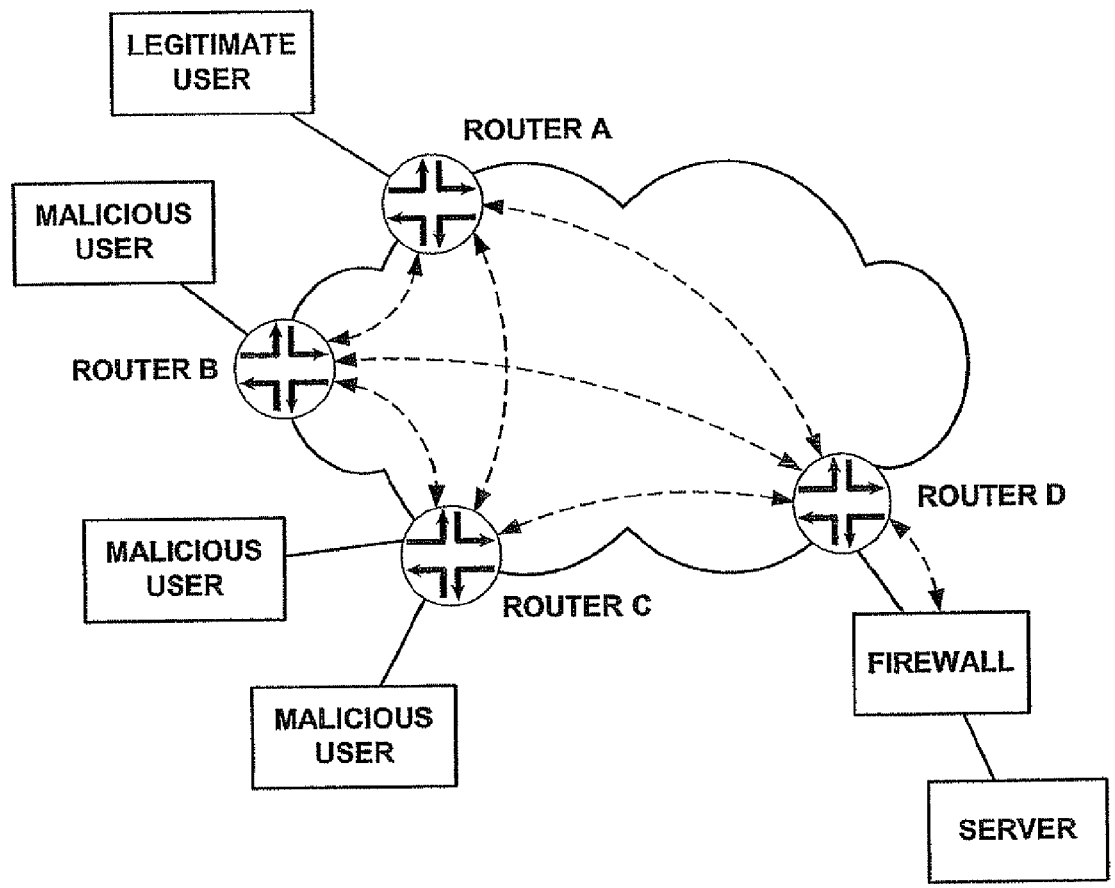
FIG. 8 illustrates piggybacking on link state routing with proxy.

FIG. 8 illustrates piggybacking attack information on link state routing information using proxy operation. The firewall detects an attack, and sends attack information to router D. Router D includes the information in link state information that is sent to routers A, B, and C. Routers A, B, and C, may in turn include the attack information in link state information forwarded to other routers in the network.

2. Send Only Operation

With send only operation, a firewall or server participates in the operation of the link state protocol, and sends information specifying attack information that it wants routers to use. The firewall or server, however, does not maintain link state information from other systems.

3. Full Routing Operation

With full routing operation, the firewall participates as a normal node in the operation of the link state routing protocol.

Figure 9:
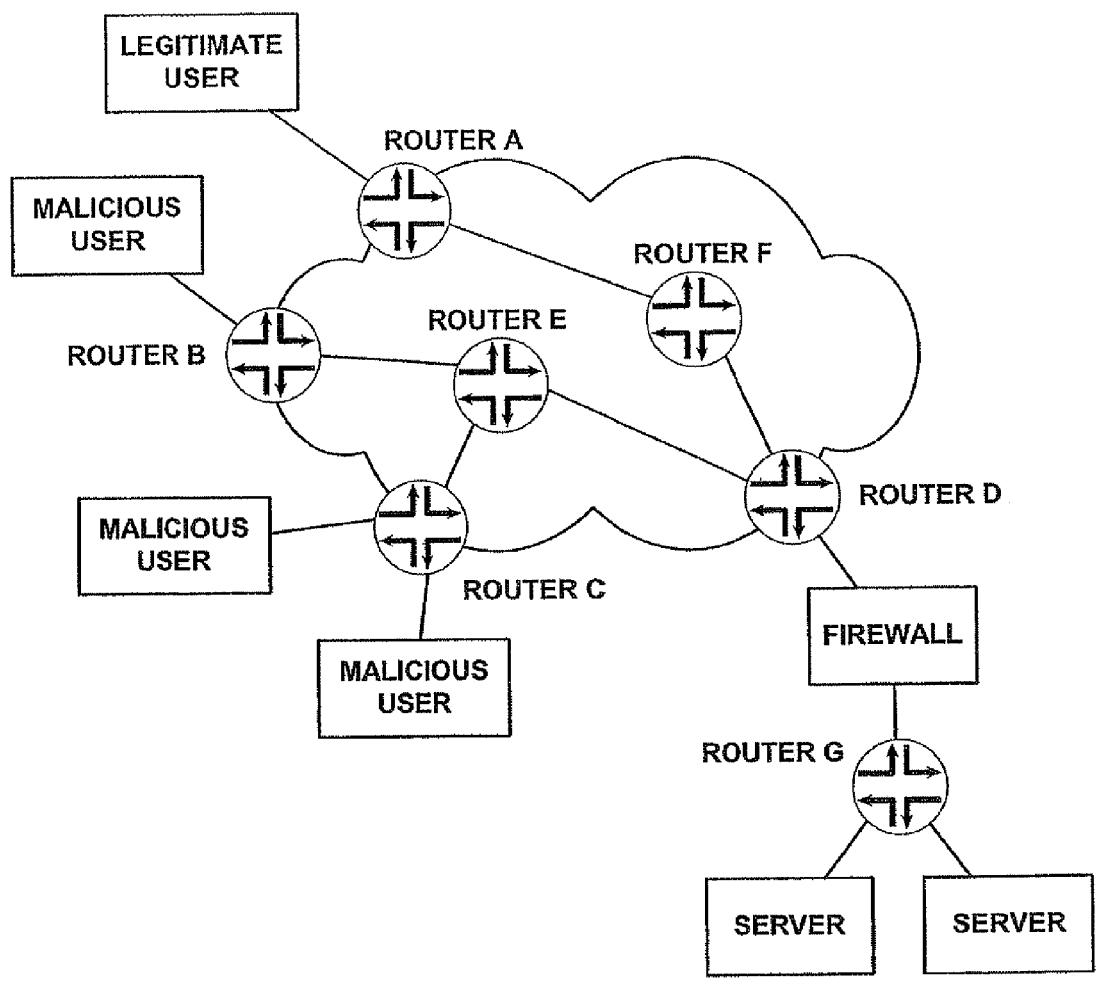
FIG. 9 illustrates use of a firewall between routers.

FIG. 9 illustrates use of a firewall between routers. In FIG. 9, there is a firewall between router D and router G. In this topology, muter D will normally be running a routing protocol directly with router G. The firewall would then normally be invisible to the routing protocol.

If router D and router G use routing protocols to carry attack information, then the particular way this is implemented depends on the method used to insert attack information into the routing protocols. For example, carrying attack information using the proxy operation, send only operation, and the full routing operation, will be implemented in different ways.

If proxy operation is used, then there is little complexity. The firewall exchanges control information with either router D or router G, or both. The router will then insert the appropriate information into link state information.

If send only operation is used, then the firewall will transmit information using the link state routing protocol, but will not receive routing information. With this approach, router D and router G will need to continue to operate as normal routing neighbors. This implies that router D or router G should have two logical interfaces on one physical interface. For example, router D may have an interface to both the firewall and router G on the same physical interface. Fortunately, this is very similar to current operation over local area networks (LANs)—a router may have interfaces to multiple other routers over the same LAN. The send only operation may therefore be used with conventional routers and conventional routing protocols over LAN interfaces.

If full routing operation is used, then the firewall participates in the operation of the routing protocol as if it is a normal router. The firewall may then be thought of as a normal router which has only two interfaces, but which has additional capability, such as attack detection and definition of attack information.

Router Configuration

Configuration of the router based on the attack information from the firewall may require creating a new filter or modifying an existing one. Several particular situations may arise in configuring the router.

In many cases attacks consist of a large number of a certain type of communication, such as transmission control protocol synchronization (TCP SYN) packets. In some cases, therefore, the attack information from a firewall that is applied by routers may include information defining the type of packets being sent, and may, for example, specifically discard or rate limit packets of a certain kind, such as TCP SYN packets. In the case that additional attacks develop, the attack information may be defined by the firewall in a way that is specific to the types of packets used in these other attacks.

One advantage of distributed filtering is that it protects against congestion in network resources between the firewall and the routers participating in the distributed filtering operation. Preventing congestion does not, however, necessarily require that all packets be discarded. Also, discarding all packets may have the unfortunate effect of inadvertently discarding valid packets (i.e., packets from legitimate users) along with the malicious packets. In some cases this might occur even after the attack has stopped, or in a part of the network where the attack has been stopped or where the attack has never occurred.

In one embodiment, rate limiting is used with distributed filtering. Control packets sent from the firewall to the routers specify a class of packets such that the router will rate limit the total traffic of that class of packets. The router will then determine, using filters for example, how many packets belong to that class and will discard packets from that class if the amount of traffic exceeds a defined threshold.

If an attack persists, this implies that the router will discard some, and possibly most of the malicious packets. Some small number of packets will be allowed to pass. The number of packets allowed to pass through the router is chosen to be small so as not to cause excessive congestion in the network. The firewall will discard the packets that get this far.

If the attack subsides in a part of the network, a router in that part of the network will find that the number of packets passing through the filter, legitimate user packets because the attack has ended in that part of the network, is small enough that the threshold is not passed. In this case, the packets will be forwarded, and legitimate users can therefore obtain proper delivery to their destination.

After a router has been configured to detect and drop malicious packets, it may be useful to remove the configuration. Generally speaking, a given attack will continue for only a limited period of time. Removing the configuration may be easy to do when link state routing is used to transfer the attack information. Link state routing protocols already have methods to flush information. For example, a given Link State Advertisement (OSPF) or Link State Packet.

(IS-IS) can be "flushed" (and announcement can be flooded indicating that the LSA or LSP no longer exists), or a replacement LSA/LSP can be flooded containing new information (or even containing no information if desired).

Preventing Malicious Filter Configuration

An attacker who learns how the attack information is sent to configure routers in the network may attempt to maliciously configure the routers by sending fabricated attack information. In response to the fabricated attack information, a router will incorrectly configure itself to filter packets that are not actually malicious, but are defined to be malicious by the fabricated attack information.

To prevent this, the firewall filter may make use of strong authentication techniques. For example, IP Security (IPSec) may be used. IPSec is a tunneling protocol for setting up paths between network devices, such as paths between a firewall or server and a router. IPSec provides a method of authentication and protects data in transit from, eavesdropping and attacks. IPSec also uses cryptography to protect communications on links between devices. Other security measures may also be used between the firewall and the routers to prevent attackers from surreptitiously turning on filters.

Central Management Embodiment

Figure 10:
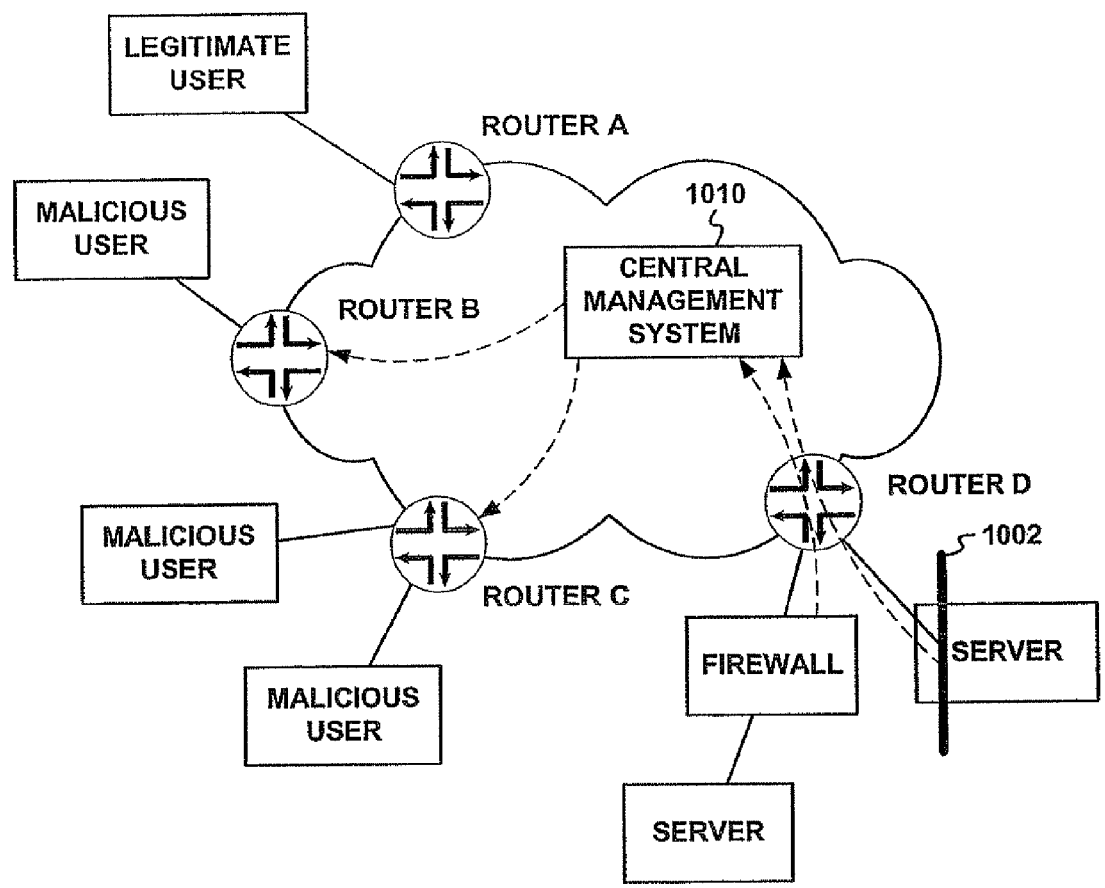
FIG. 10 illustrates a network consistent with the principles of the invention using a central management system.

FIG. 10 illustrates a distributed filtering system using a central management system consistent with the principles of the invention. The distributed filtering system of FIG. 10 includes a physically separate firewall as well as a server configured with a firewall 1002. Each firewall participates in detecting an attack. In response to detecting an attack, or some sort of indication of an attack, each firewall creates attack information defining what has been detected regarding the attack, and sends the attack information to router D and central management system 1010. The attack information may come from one or both of the firewalls.

Central management system 1010 receives the attack information and uses the information to assist in coordinating a response to the attack. For example, central management system 1010 may forward the attack information directly to routers B and C, the routers connected to malicious users. Central management system 1010 may also analyze the attack information and develop alternative attack information that is forwarded to routers B and C. Central management system 1010 may collect information from routers indicating the number of packets which have been found to match the filters, for example this might include the number of packets which have been discarded due to filters, or the number of packets which have been found to match the rate limits which have been set in routers.

Router D may also respond to the attack information by configuring its filters based on the attack information. Router D may also receive attack information from central management system 1010 and configures its filters based on the attack information.

Central management system 1010 may also perform support functions related to attack detection and prevention, such as logging events associated with the attack or collecting other information regarding the attacks. Central management system 1010 is illustrated as being located in the network, but in other embodiments consistent with the principles of the invention central management system 1010 may be located outside the network, or may be implemented as part of a network device, such as router D. In other embodiments consistent with the principles of the invention, central management system 1010 is comprised of distributed components. For example, the components may be distributed in the network, outside the network, or both. The components cooperate to collect and process attack information, forward attack information to routers in the network for distributed filtering.

Although FIG. 10 illustrates two firewalls, in another embodiment consistent with the principles of the invention, there may be a combination of servers with firewalls and physically separate firewalls, each implementing complex stateful filters that are needed for initial detection of attacks, such as DOS and DDOS attacks. The servers and firewalls may be centrally located or distributed, and may be connected to the network through a single router, or through multiple other devices.

Dual-Homed Firewall

Figure 11:
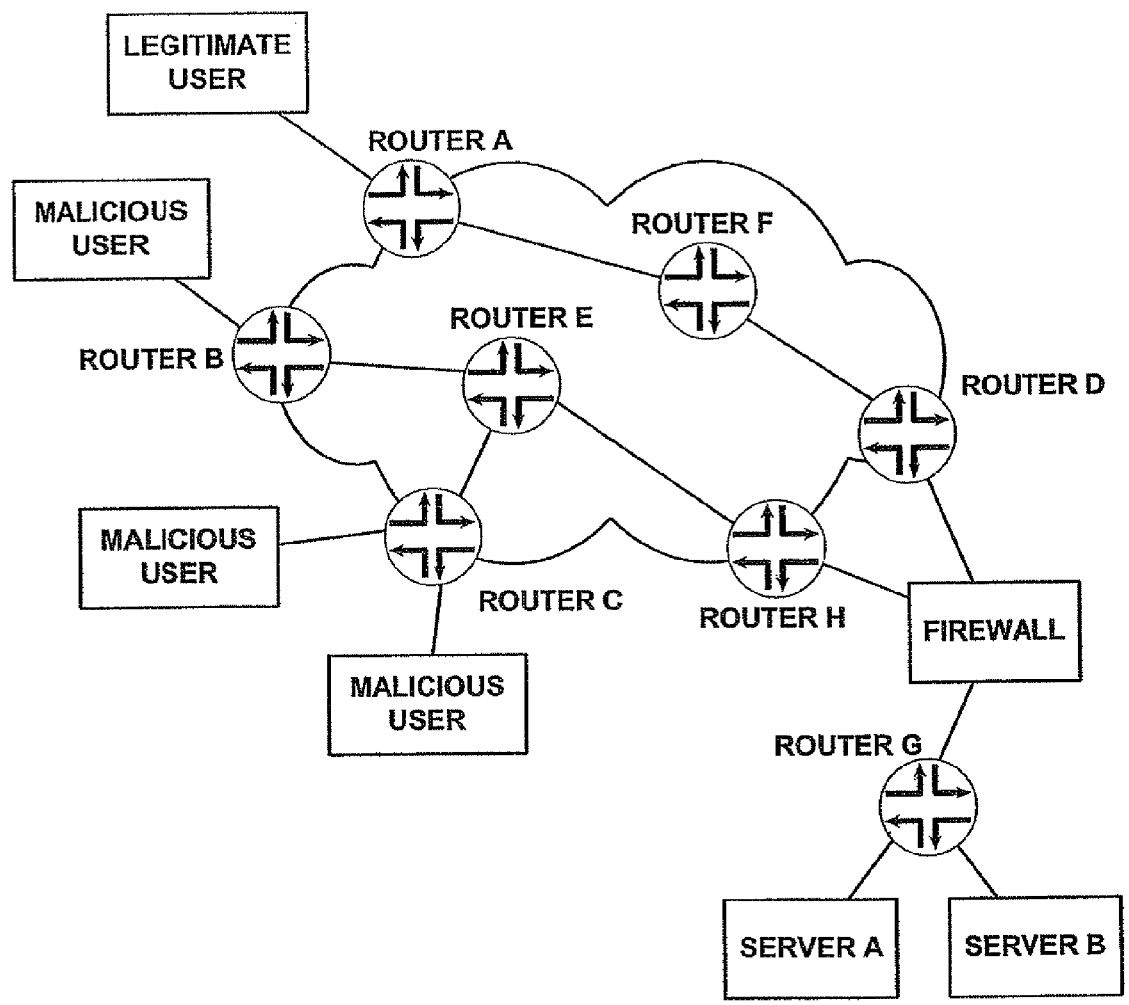
FIG. 11 illustrates a dual-homed firewall.

FIG. 11 illustrates a dual-homed firewall. This dual-homed firewall has interfaces to two different routers, routers D and H, towards the core of the network. In this case, it is necessary to ensure that router D does not try to forward traffic destined for router H via the firewall. Ensuring that router D does not try to forward traffic destined for router H via the firewall may depend upon which link state routing protocol is used, as well as the particular method used to insert attack information into the routing protocols. With proxy operation, for example, the firewall does not participate in operation of the routing protocol, so this problem does not occur.

For some link state routing protocols (e.g., PNNI) it is possible for systems to say that they are "non-transit" or "reduced operation." In this case, a router will not choose to forward packets via that system unless there is no other path available.

In other cases, the metrics assigned to links can be set to prevent incorrect routing. For example, suppose that in FIG. 11 the links between the firewall and router D and router H are set to have very large metric values. In this case, if router D has a packet destined for router H, it will choose a different path in order to avoid the large-metric costs on the paths via the firewall.

CONCLUSION

Although the embodiments described herein have relied on a firewall to detect attacks, in other embodiments consistent with the principles of the invention a router or other network device may be used to monitor network traffic, detect an attack, develop attack information based on the attack, and send the attack information to other devices in the network. The other devices can then configure themselves based on the attack information to detect and discard particular types of network traffic. Although the embodiments described herein focused on single attacks to explain aspects of the invention, it is understood that systems and methods consistent with the principles of the invention also handle multiple simultaneous attacks. After an attack detection device detects an attack and forwards attack information to attack response devices, the attack detection device will in general continue monitoring for other attacks. Similarly, the attack detection device may discover multiple attacks over time, or multiple different attack detection devices may discover multiple attacks, and therefore at any one point in time the attack response devices may have multiple filters in effect discarding or rate limiting attack traffic.

Other embodiments of the invention will be apparent to those skilled in the art from consideration of the specification and practice of the invention disclosed herein. For example, while the invention has been described in connection with configuring a router to detect and discard malicious packets, embodiments consistent with the principles of the invention may also be used in a switch or other networking devices in systems that undergo attacks. It is intended that the specification and examples be considered as exemplary only, with a true scope and spirit of the invention being indicated by the following claims.

What is claimed is:

1. A system, comprising:
a network device, comprising:
a memory, and
a processor to:
detect an attack associated with first traffic received via a network connected to the network device,
determine one or more characteristics of the first traffic,
create control information based on the one or more characteristics of the first traffic,
the control information including data identifying:
at least one source address associated with the first traffic,
at least one destination address associated with the first traffic, and
a protocol associated with the first traffic,
the creating of the control information further including:
determining a rate limit value, and
including data identifying the rate limit value in the control information;
identify, based on the control information, one or more devices of a plurality of devices in the network:
the one or more devices being different from the network device, and
the network device, when identifying the one or more devices, being further to:
determine whether the at least one source address can be verified,
when the at least one source address cannot be verified, identify a plurality of network ingress devices in the network as the one or more devices, and
when the at least one source address can be verified, identify only one or more particular network ingress devices of the plurality of network ingress devices that are associated with the at least one source address as the one or more devices,
forward the control information to the one or more devices,
the one or more devices filtering second traffic associated with the attack based on the rate limit value and one or more of the at least one source address associated with the first traffic, the at least one destination address associated with the first traffic, or the protocol associated with the first traffic,
receive, from at least one device of the plurality of devices, information regarding characteristics of the second traffic,
determine, based on the received information, that the attack has ended, and
provide, to the one or more devices, an indication associated with determining that the attack has ended.

2. The system of claim 1, wherein the network device, when forwarding the control information, is further to:
forward the control information using a link state routing protocol or a path vector routing protocol.

3. The system of claim 1, wherein the network device, when forwarding the control information, is further to:
establish, using a secure tunneling protocol, at least one secure connection with the one or more devices, and forward, via the at least one secure connection, the control information to the one or more devices.

4. The system of claim 1, wherein the network device, when forwarding the control information to the one or more devices is further to:
send the control information to a first device of the one or more devices, and
cause the first device to forward the control information to a second device of the one or more devices.

5. The system of claim 1, wherein the network device, when creating the control information, is further to:
include, in the control information, information identifying a time during which the one or more devices use the control information.

6. The system of claim 1, wherein the network device, when forwarding the control information, is further to:
cause the one or more devices to allow a particular portion of the second traffic to reach the network device, and
wherein the network device, when determining that the attack has ended, is further to:
receive the particular portion of the second traffic, and
determine that the attack has ended further based on the particular portion of the second traffic.

7. A method, comprising:
receiving, by a first device associated with a network, first traffic;
identifying, by the first device, that the first traffic is associated with an attack;
identifying, by the first device and based on identifying that the first traffic is associated with the attack, one or more characteristics of the first traffic;
generating, by the first device, control information based on the one or more characteristics of the first traffic,
the control information including data identifying:
at least one source address associated with the first traffic,
at least one destination address associated with the first traffic, and
a protocol associated with the first traffic;
the generating of the control information further including:
determining a rate limit value, and
including data identifying the rate limit value in the control information;
identifying, based on the control information, at least one second device to receive the control information,
the identifying of the at least one second device including:
determining whether the at least one source address can be verified,
identifying, when the at least one source address cannot be verified, a plurality of network ingress devices associated with the network as the at least one second device, and
identifying, when the at least one source address can be verified, only one or more particular network ingress devices of the plurality of network ingress devices that are associated with the at least one source address as the at least one second device;
sending the control information to the at least one second device;
the at least one second device filtering second traffic associated with the attack based on the rate limit value and one or more of the at least one source address associated with the first traffic, the at least one destination address associated with the first traffic, or the protocol associated with the first traffic;
receiving, by the first device, information regarding characteristics of the second traffic;
determining, by the first device and based on the received information, that the attack has ended; and
providing, by the first device and based on determining that the attack has ended, an indication to the at least one second device.

8. The method of claim 7, further comprising:
detecting, based on the control information, third traffic associated with the attack; and
filtering the third traffic.

9. The method of claim 7, wherein the sending of the control information to the at least one second device includes:
sending the control information using at least one of:
a distributed routing protocol,
a link state routing protocol,
a markup language, or
a hypertext protocol.

10. The method of claim 7, wherein the sending of the control information to the at least one second device includes:
establishing, using a secure tunneling protocol, a secure connection to the at least one second device, and
sending the control information using the secure connection.

11. The method of claim 7, further comprising:
identifying a third device to receive the control information, the third device being different from the first device and the at least one second device; and
causing the at least one second device to forward, based on receiving the control information, the control information to the third device.

12. The method of claim 7, wherein the generating of the control information includes:
including, in the control information, data identifying a time period, wherein the at least one second device uses the control information, during the time period, to detect the second traffic associated with the attack.

13. The method of claim 7, wherein the generating of the control information further includes:
including, in the control information, authentication information, wherein the at least one second device uses the authentication information to verify that the control information was sent from the first device.

14. The method of claim 7, wherein sending the control information to the at least one second device further includes:
causing the at least one second device to allow a particular portion of the second traffic to reach the first device, and
wherein determining that the attack has ended further includes:
receiving the particular portion of the second traffic; and
determining that the attack has ended further based on the particular portion of the second traffic.

15. A network device, comprising:
a memory, and
a processor to:
detect incoming traffic that is associated with an attack on a network,
store, in the memory, characteristics associated with the incoming traffic,
generate control information based on the characteristics associated with the incoming traffic,
the control information including data identifying at least one source address associated with the incoming traffic, the generating of the control information further including:
   determining a rate limit value, and
   including data identifying the rate limit value in the control information;
identify, based on the control information, one or more devices of a plurality of devices in the network,
   the processor, when identifying the one or more devices, being further to:
      determine whether the at least one source address can be verified,
      when the at least one source address cannot be verified, identify a plurality of network ingress devices in the network as the one or more devices, and
      when the at least one source address can be verified, identify only one or more particular network ingress devices of the plurality of network ingress devices that are associated with the at least one source address as the one or more devices, and
   transmit the control information to the one or more devices,
      the one or more devices filtering additional traffic based on the rate limit value and the at least one source address associated with the incoming traffic,
   receive, from the one or more devices, the filtered additional traffic,
   determine, based on the filtered additional traffic, that the attack has ended, and
   cause the one or more devices to stop using the control information based on determining that the attack has ended.

16. The network device of claim 15, wherein the processor, when transmitting the control information to the one or more devices, is further to:
   transmit the control information to the one or more devices using at least one of:
      a link state routing protocol,
      a path vector routing protocol, or
      a distributed routing protocol.

17. The network device of claim 15, wherein the processor, when transmitting the control information to the one or more devices, is further to:
   establish, using a secure tunneling protocol, a secure connection between the network device and at least one of the one or more devices; and
   transmit, to at least one of the one or more devices, the control information via the secure connection.

18. The network device of claim 15, wherein the processor, when generating the control information, is further to:
   include, in the control information, authenticating data identifying the network device to the one or more devices.

19. The network device of claim 15, wherein the processor, when transmitting the control information to the one or more devices, is further to:
   encrypt the control information, and
   transmit the encrypted control information to the one or more devices.

20. The network device of claim 15, wherein the processor, when determining that the attack has ended, is further to:
   receive, from one of the one or more devices and after transmitting the control information, information associated with characteristics of the additional traffic, and
   determine that the attack has ended further based on the received information.

21. The network device of claim 15, wherein the processor is further to:
   filter the incoming traffic based on the control information,
   determine filter information associated with filtering the incoming traffic, and
   detect, based on the filter information, the additional trafficassociated with the attack.

22. A method, comprising:
   receiving, by a first device and via a network, incoming traffic;
   detecting, by the first device, a network attack associated with the incoming traffic;
   generating, by the first device, control information based on characteristics of the network attack,
      the control information including information identifying:
         at least one source address associated with the incoming traffic, and
         at least one destination address associated with the incoming traffic,
      the generating of the control information further including:
         determining a rate limit value, and
         including information identifying the rate limit value in the control information;
   identifying at least one second device of a plurality of devices in the network,
      identifying the at least one second device including:
         determining whether the at least one source address can be verified,
         identifying, when the at least one source address cannot be verified, a plurality of network ingress devices associated with the network as the at least one second device, and
         identifying, when the at least one source address can be verified, only one or more particular network ingress devices of the plurality of network ingress devicesthat are associated with the at least one source address as the at least one second device;
   transmitting, from the first device and to the at least one second device, the control information,
      the control information enabling the at least one second device to filter additional traffic based on the rate limit value and one or more of the at least one source address associated with the incoming traffic or the at least one destination address associated with the incoming traffic;
   receiving, by the first device, the filtered additional traffic from the at least one second device;
   determining, by the first device based on the filtered additional traffic, that the attack has ended; and
   providing, by the first device, an indication to the at least one second device associated with determining that the attack has ended.

23. The method of claim 22, wherein the network attack includes a denial of service attack.

24. The method of claim 22, further comprising:
   filtering the incoming traffic based on the control information.

25. The method of claim 24, wherein the filtering of the incoming traffic includes:
   storing state information related to one or more received requests for service; and
   filtering, based on the stored state information, the incoming traffic using stateful filtering.

26. The method of claim 22, further comprising:
- receiving, from the at least one second device, information related to the additional traffic;
- updating the control information using the received information; and
- sending the updated control information to the at least one second device.

27. The method of claim 22, wherein determining that the attack has ended further includes:
- receiving, from the at least one second device, the information associated with the filtered additional traffic; and
- determining, that the attack has ended further based on the received information associated with the filtered additional traffic.

\* \* \* \* \*